United States Patent [19]
Wilcock et al.

[11] 3,909,081
[45] Sept. 30, 1975

[54] LOAD BALANCING SYSTEM FOR ROTATING SHAFTS

[75] Inventors: Donald F. Wilcock; Leo W. Winn, both of Schenectady, N.Y.

[73] Assignee: Mechanical Technology Incorporated, Latham, N.Y.

[22] Filed: Mar. 26, 1974

[21] Appl. No.: 455,012

[52] U.S. Cl. ................................. 308/9; 308/122
[51] Int. Cl.² ........................................ F16C 7/04
[58] Field of Search .............. 308/9, 122, DIG. 1

[56] References Cited
UNITED STATES PATENTS

| | | | |
|---|---|---|---|
| 3,101,224 | 8/1963 | Adams | 308/122 |
| 3,374,039 | 3/1968 | Voorhies | 308/122 X |

*Primary Examiner*—M. Henson Wood, Jr.
*Assistant Examiner*—Gene A. Church
*Attorney, Agent, or Firm*—Joseph V. Claeys; Charles W. Helzer

[57] ABSTRACT

A confined cavity is disposed adjacent selected surface areas of a rotatably supported shaft and filled with pressurized liquid for generating a net force on the shaft of a magnitude and direction to balance out all, or a desired portion, of the load forces and relieve the shaft supporting bearing means from such loads. The system can be readily made to produce both radial and axial load balancing forces.

17 Claims, 3 Drawing Figures

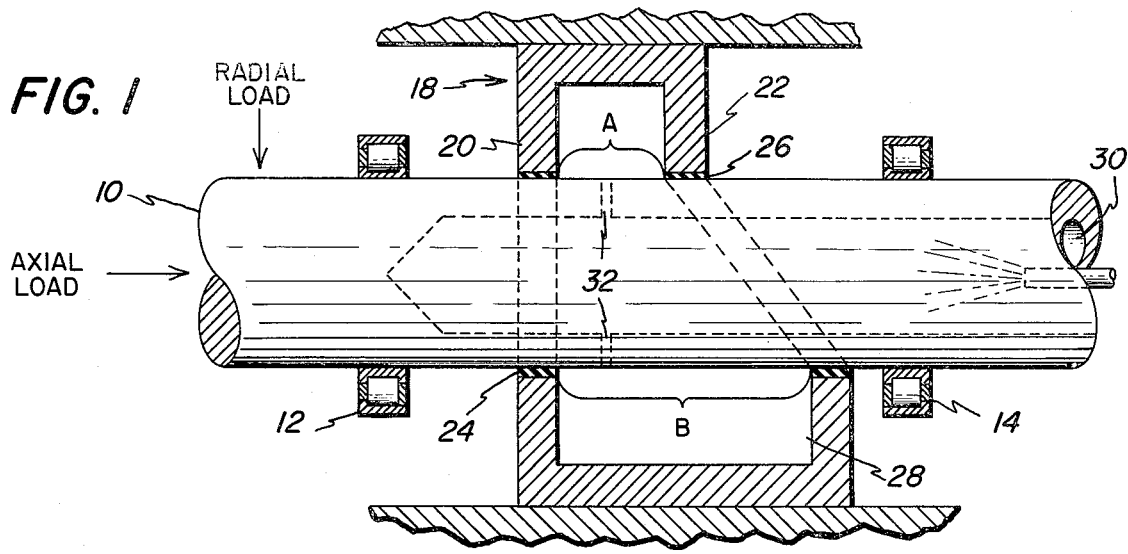
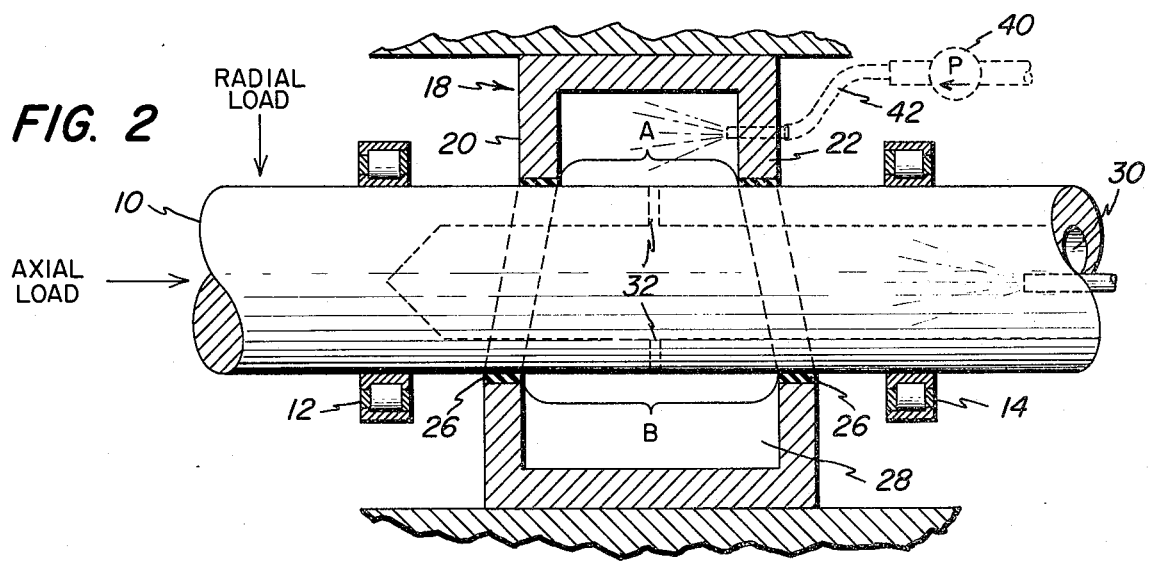
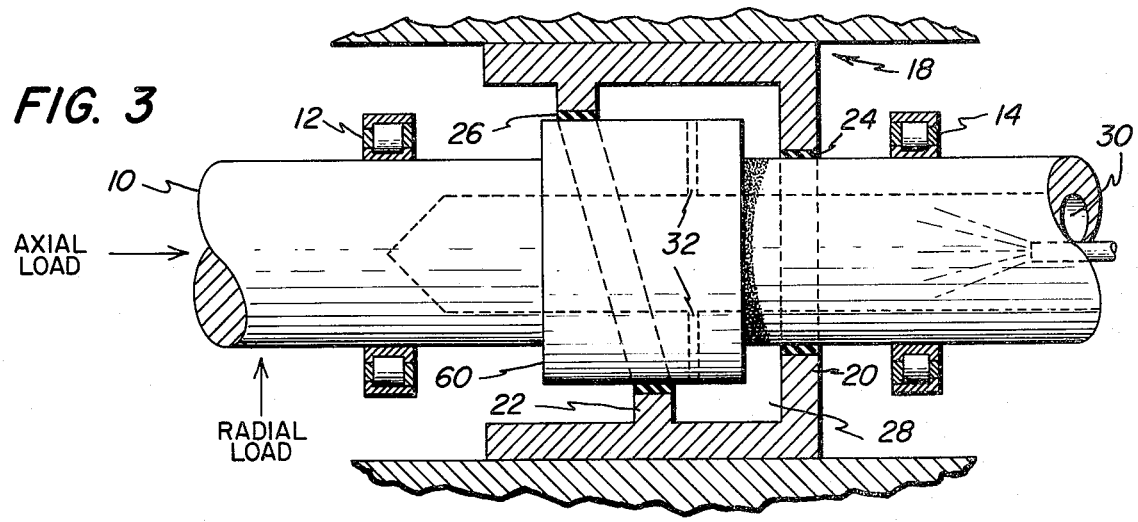

LOAD BALANCING SYSTEM FOR ROTATING SHAFTS

BACKGROUND OF THE INVENTION

The present invention relates in general to load balancing devices for use on the shafts of rotating machines, which shafts are supported by rolling element bearings, and which are subjected to radial loads. The invention relates more particularly to load balancing devices wherein forces are hydraulically generated on the shaft and which forces are radially directed so as to oppose the loads on the shaft and relieve the bearings therefrom.

One of the major limiting factors on the life of rotating machinery is the fatigue endurance life of the rolling element bearing assemblies used in carrying the applied loads. Depending upon the particular application, these loads take various forms. Turbines, pumps and other rotating machinery often generate large axial or thrust loads. The input shafts of helicopter transmissions, for example, are subjected both to axial loads and radial loads as generated by bevel gears used to transmit power to the helicopter drive shaft or the like.

Conventionally these large loads are supported by large bearing assemblies.

A disadvantage to the use of physically large bearing assemblies is that the increased mass of the rolling elements creates increased centrifugal forces on the bearing race greatly reducing the life of the bearing. These forces are in addition to any loads impressed.

The fatigue endurance life of bearing assemblies has a statistical distribution so that it varies widely with the nature of use, such that bearings may often fail catastrophically even early in life. It would be highly desirable to increase the fatigue endurance life by reducing the external loads required to be carried by the rolling element, and allowing the use of physically smaller bearings which generate reduced centrifugal loads. This can provide significant improvements in bearing life and performance.

Accordingly, it is an object of this invention to provide an hydraulic load balancer for simply and reliably relieving radial loads on rolling element bearings.

It is another object of this invention to provide a load balancer easily adaptable to different loading situations.

It is yet another object of this invention to provide a load balancer easily incorporated into existing structures.

It is a further object of this invention to provide a load balancer requiring a minumum of additional parts.

It is yet a further object of this invention to provide a load balancer which is inexpensive and simple to manufacture.

Briefly stated, in accordance with one aspect of this invention, an hydraulic radial load balancer includes a shaft rotatably supported by rolling element bearings and on which radial loads are present. A housing is provided through which the shaft passes, having seal means at each end thereof in a sealing relationship with the shaft and forming an annular cavity between the shaft and the housing. The seals are disposed at a predetermined angle to each other and are not parallel. The cavity thus formed is of irregular shape having parallel sides and oblique ends. Means are provided to maintain a liquid under pressure in the cavity so that a radial force is produced on the shaft of the desired magnitude and in a direction to balance the radial load present and relieve the rolling element bearing assembly therefrom.

The novel features believed characteristic of this invention are set forth with particularity in the appended claims. The invention itself, however, both as to its organization and method of operation together with further objects and advantages thereof may best be understood by reference to the following description taken in conjunction with the accompanying drawing, and in which:

FIG. 1 is a diagrammatic partially sectioned view of an hydraulic load balancer in accordance with one embodiment of this invention.

FIG. 2 is a diagrammatic partially sectioned view of another embodiment of the invention.

FIG. 3 is a diagrammatic partially sectioned view of another embodiment of the invention wherein both axial and radial forces are produced.

DETAILED DESCRIPTION OF THE INVENTION

There is shown in FIG. 1 an hydraulic radial load balancer in accordance with one embodiment of this invention. A shaft 10 is rotatably supported by rolling element bearing means 12 and 14 and is rotatably driven by drive means (not shown), and in turn drives a load which may have axial and radial components.

In accordance with this invention means are provided to selectively apply fluid pressure to the surface of shaft 10 in a manner to produce a net radial force of a magnitude and direction to balance out all, or a desired portion, of the radial load component. To this end, means are provided to define a confined cavity adjacent a selected surface area of the shaft and means to maintain pressurized fluid in the cavity to produce the desired radial load balancing force.

In the arrangement shown in FIG. 1, a generally cylindrical housing 18 having annular projections 20 and 22 and seals 24 and 26 defines an annular cavity 28. Cavity 28 is shown as surrounding a portion of shaft 10 and is made to have an irregular shape such that the shaft surface area enclosed by the cavity varies with radial direction. To this end, seals 24 and 26 are not parallel but are disposed at a preselected angle to each other. Accordingly, as shown in FIG. 1 the shaft surface area A enclosed by the upper portion of cavity 28 is smaller than the shaft surface area B enclosed by the lower portion thereof.

Pressurized liquid is fed to cavity 28 such as by a pumping means utilizing the centrifugal force of the rotating shaft as shown in detail in the drawings, by an external pump means as illustrated in phantom in connection with FIG. 2, or by any other suitable means for maintaining liquid under pressure in cavity 28.

In operation, when cavity 28 is filled with pressurized liquid a force $$(\vec{F} = \int_A P \vec{N} \, dA),$$

where P is the pressure and A is the area, is produced on shaft 10 which is the sum of the forces around the shaft. Since there is a greater shaft surface area exposed to the pressurized liquid in the lower portion of cavity 28 than in the upper portion thereof, the resultant radial force is in the upward direction. The magnitude of the force so produced is determined by the liquid pressure, the angle of the oblique seal, and the diameter of the shaft. Accordingly, by selecting a suitable angle of inclination of the oblique seal, the magnitude of the force can be made equal to the magnitude of the radial load component thereby lessening the radial load on the rolling element bearings.

In the arrangement shown in FIG. 1, a liquid flow path is provided to cavity 28 which flow path is arranged with respect to the axis of rotation of the shaft so that liquid is delivered to the cavity 28 adjacent the surface of the shaft and the centrifugal force of rotation acts upon the liquid to produce flow of the liquid outwardly from the axis with a concomitant increase in its pressure.

As shown, shaft 10 is provided with an axial bore 30 and one or more radial passages 32 which communicate with axial bore 30 and the cavity 28. Means shown at 34 are provided to supply liquid to axial bore 30.

When shaft 10 rotates the mass of liquid in axial bore 30 will be subjected to centrifugal force of an amount which depends on the speed of rotation of the shaft. Depending on the speed of rotation the centrifugal force acting on the mass of liquid can be sufficient to produce in the liquid, when confined in cavity 28, a substantial pressure. For example, the liquid is caused to flow through radial passages 32 outwardly from the axis of rotation of the shaft under the action of the centrifugal forces due to the rotation of the liquid mass about such axis. Moreover, while flowing in such passages under the action of centrifugal force, the pressure of the liquid will be raised from a relatively low pressure adjacent the axis to a considerably higher pressure at a point in the passage remote from the axis.

The foregoing described arrangement is simple and effective and requires no additional components nor does it require any moving parts other than that already provided by the rotating shaft. Since the balancing force generated depends on and changes with the speed of rotation of the shaft, where it is necessary or desirable to maintain such a balancing force independent of shaft rotation, pressurized liquid may be supplied directly to cavity 28 such as by an external pump means 40 and liquid line 42 as illustrated in phantom in connection with FIG. 2.

There is shown in FIG. 2 a hydraulic radial load balancer in accordance with another embodiment of the invention wherein both shaft seals are oblique to the shaft. In this way it is possible to produce a balancing force of greater magnitude than that produced by the arrangement of FIG. 1 without the necessity of an excessively high angle of inclination of any shaft seal.

There is shown in FIG. 3 a load balancer in accordance with yet another embodiment of this invention wherein both radial and axial load balancing forces are produced. A shaft 10 is provided having an elongated cylindrical enlargement 60. A housing 18 having a first annular projection 20 and a seal 24 acting on the shaft 10, and an annular projection 22 and a seal 26 acting on the enlargement 60 at a predetermined angle. The combination of the shaft 10, the enlargement 60 and the housing 18 form an annular cavity surrounding the shaft and the cylindrical enlargement, the cavity being especially suited to be pressurized with a liquid.

In operation, liquid pressure in the cavity creates forces on the shaft in both the axial and in the radial directions. The axial force is proportional to the area of the shaft enlargement in the axial direction, and the radial force is proportional to the sum of the forces taken around the circumference of the enlargement. Due to the inclination of the seal on the enlargement, there is a net surface area presented in one radial direction which results in a net force in the opposite direction. Note that there is no net radial force on the portion of the shaft not encompassed by the oblique seal.

While illustrative embodiments of the invention have been shown in the drawings and described in detail herein, it is believed obvious that other modifications and variations of the invention are possible in the light of the foregoing teachings. It is therefore to be understood that the present description is to be considered as an exemplification of the principles of the invention and that changes may be made in the various embodiments of the invention described without departing from the full intended scope of the invention particularly pointed out in the appended claims.

What we claim and desire to secure by Letters Patent of the United States is:

1. A hydraulic radial load balancer for producing a radial force on a shaft which is rotatably supported by rolling element bearing assemblies and being subjected to radial loads, to balance said loads and relieve said bearing assemblies from the effect thereof comprising:
    a. a hollow housing operative to pass said shaft therethrough and having means at each end thereof in a sealing relationship with said shaft and housing to provide seals therefor and define a cavity around said shaft, said seals being disposed at a predetermined angle and not parallel to each other; and
    b. means for maintaining a liquid under pressure in said cavity.

2. The hydraulic radial load balancer recited in claim 1 wherein said means for maintaining said liquid under pressure comprises:
    a. a reservoir within said shaft and means for supplying liquid to said reservoir; and
    b. a plurality of radial passages extending from said reservoir through the wall of said shaft and communicating with said cavity so that upon rotation of said shaft a centrifugal pumping action will occur and pressure will be maintained in said cavity.

3. The hydraulic load balancer recited in claim 1 wherein said means for maintaining liquid under pressure comprises internal centrifugal pump means operative to pump liquid from the interior of said shaft to said cavity and maintain a fluid pressure therein.

4. The hydraulic radial load balancer recited in claim 1 wherein said means for maintaining a liquid under pressure comprises:
    a. external pump means; and
    b. means communicating the output of said pump means with said cavity.

5. A hydraulic load balancing device having the capability of generating both radial and axial forces on a shaft rotatably supported by rolling element bearing assemblies and being subjected to radial and axial loads to balance said loads and relieve said bearing assemblies from the effect thereof comprising:
    a. a generally cylindrical enlargement on said shaft;
    b. a hollow housing operative to contain a portion of said shaft and a portion of said enlargement therein;
    c. seal means at each end of said housing, said seal means including a first seal in sealing relationship with said housing and said shaft, and a second seal in a sealing relationship with said housing and said cylindrical enlargement, said seals being disposed at a predetermined angle and not parallel to each other to define with said housing an annular cavity around said shaft; and d. means for maintaining a liquid under pressure in said cavity.

6. The hydraulic load balancer recited in claim 5 wherein said means for maintaining liquid under pressure comprises:

a. a reservoir within said shaft;

b. means for supplying a liquid to said reservoir;

c. a plurality of radial passages extending from said reservoir through the wall of said shaft and communicating with said cavity so that upon rotation of said shaft a centrifugal pumping action will occur and pressure will be maintained in said cavity.

7. The hydraulic load balancer recited in claim 5 wherein said means for maintaining liquid under pressure comprises:

a. pump means; and b. tubing means communicating the output of said pump means with said cavity.

8. The hydraulic radial load balancer as recited in claim 1 wherein one of said seals is perpendicular to said shaft.

9. The hydraulic radial load balancer recited in claim 1 wherein neither seal is perpendicular to said shaft.

10. The hydraulic load balancer as recited in claim 5 wherein one of said seals is perpendicular to said shaft.

11. The hydraulic load balancer as recited in claim 5 wherein neither of said seals is perpendicular to said shaft.

12. The hydraulic load balancer as recited in claim 10 wherein said perpendicular seal is on said shaft.

13. The hydraulic load balancer as recited in claim 10 wherein said perpendicular seal is on said enlarged section.

14. The hydraulic load balancer as recited in claim 5 wherein said radial bores extend through said shaft.

15. The hydraulic load balancer as recited in claim 5 wherein said radial bores extend through said enlarged section.

16. A method for producing radial forces on a shaft supported by rolling element bearings and subjected to radial loads so that the forces balance a predetermined portion of said loads and relieve said bearings therefrom comprising:

a. surrounding a linear portion of said shaft with a housing having a seal at each end thereof in sealing relationship with said shaft, said seals being disposed at an angle to each other and not parallel;

b. creating an annular cavity within said housing and surrounding said shaft suitable to be pressurized with a fluid; and c. maintaining a fluid under pressure within said cavity so that radial forces are produced on said shaft which forces vary with radial direction and result in a net force in a predetermined direction.

17. A load balancing system for rotating shafts comprising:

a. A confined cavity disposed adjacent the surface of a rotatably supported shaft and extending over a preselected surface area, said cavity being defined by a housing portion and seals disposed at each end thereof arranged at a predetermined angle to each other and not parallel; and b. Means maintaining liquid under pressure in said cavity operative to apply liquid pressure to said preselected shaft surface area and generate net forces of a magnitude and direction to oppose the forces of the load.

* * * * *